(12) United States Patent
Horst

(10) Patent No.: US 12,411,903 B2
(45) Date of Patent: Sep. 9, 2025

(54) SENSING DEVICE AND REPORT GENERATION WEB SITE ACCESSED THROUGH DYNAMIC QR CODES

(71) Applicant: Horst Tech, LLC, Bellevue, WA (US)

(72) Inventor: Robert W. Horst, Bellevue, WA (US)

(73) Assignee: Horst Tech, LLC, Bellevue, WA (US)

( * ) Notice: Subject to any disclaimer, the term of this patent is extended or adjusted under 35 U.S.C. 154(b) by 0 days.

(21) Appl. No.: 18/506,860

(22) Filed: Nov. 10, 2023

(65) Prior Publication Data

US 2024/0160682 A1    May 16, 2024

Related U.S. Application Data

(60) Provisional application No. 63/383,671, filed on Nov. 14, 2022.

(51) Int. Cl.
*G06F 16/955* (2019.01)
*G05B 23/02* (2006.01)
*G06K 7/14* (2006.01)

(52) U.S. Cl.
CPC ..... *G06F 16/9554* (2019.01); *G05B 23/0272* (2013.01); *G06K 7/1417* (2013.01)

(58) Field of Classification Search
CPC ............ G06F 16/9554; G05B 23/0272; G06K 7/1417
USPC .................................................. 235/462.01
See application file for complete search history.

(56) References Cited

U.S. PATENT DOCUMENTS

| | | | |
|---|---|---|---|
| 9,109,981 B2 | 8/2015 | Sharp | |
| 10,830,466 B2 | 11/2020 | Secor | |
| 11,051,701 B1 * | 7/2021 | Gaines | G06T 7/73 |
| 2015/0212057 A1 | 7/2015 | Darveau | |
| 2018/0188218 A1 | 7/2018 | Sohn | |
| 2019/0387981 A1 * | 12/2019 | Warner | A61B 5/026 |
| 2020/0116615 A1 | 4/2020 | Bertini et al. | |
| 2020/0232959 A1 | 7/2020 | Armitage | |
| 2020/0258606 A1 * | 8/2020 | Ferentz | G06F 16/245 |
| 2021/0077836 A1 | 3/2021 | Ferraro et al. | |
| 2021/0132037 A1 * | 5/2021 | Kanazawa | G01N 33/48792 |
| 2021/0182641 A1 * | 6/2021 | Juhala | G06K 19/06131 |

(Continued)

FOREIGN PATENT DOCUMENTS

| | | | | |
|---|---|---|---|---|
| CA | 3170582 A1 * | 9/2021 | ............. | A61B 5/015 |
| CN | 110503348 | 11/2019 | | |

OTHER PUBLICATIONS

Chen et al., "The Carbon Dioxide Concentration Detection Using Mobile Phones Combine Bluetooth and QR Code", *University of Illinois: IEEE Xplore*, Downloaded Oct. 3, 2022, in 6 pages.

(Continued)

*Primary Examiner* — Michael G Lee
*Assistant Examiner* — David Tardif
(74) *Attorney, Agent, or Firm* — Knobbe Martens Olson & Bear LLP

(57) ABSTRACT

A sensing device comprising a battery, sensing devices, programmable controller, memory and user interface capable of displaying a QR code. Code running in the programmable device for recording sensor values and encoding them into a device data string and converting the string into a web site address for requesting a report. A web site with code for decoding the query string, appending user supplied data and time information, and generating a report web page presenting the recorded sensor values.

15 Claims, 6 Drawing Sheets

(56) References Cited

U.S. PATENT DOCUMENTS

2022/0365048 A1  11/2022  Horst
2022/0366429 A1* 11/2022  Pati ...................... G06Q 30/012

OTHER PUBLICATIONS

Daisey et al., "Indoor Air Quality, Ventilation And Health Symptoms In Schools: An Analysis Of Existing Information" Indoor Air, 2003, Lawrence Berkeley National Laboratory-48287, pp. 1-20.

Fazackerley et al., "Bridging the Last Mile: Utilizing QR codes, e-Paper and Smartphones to LinkLow-Power IoT Data Collection Devices to the Internet", *IEEE Sensors Applications Symposium (SAS)*, 2021, in 6 pages.

GMD/W20 Series Carbon Dioxide Transmitters for Demand Controlled Ventilation Applications-Datasheet, 2009, 2 pages.

Godwin et al., "Indoor Air Quality in Michigan Schools" Indoor Air, 2007, vol. 17 pp. 109-121.

Grontoft et al., "Assessment Of Indoor Air Quality And The Risk Of Damage To Cultural Heritage Objects Using Memori Dosimetry", Studies on Conservation, 2016, vol. 61, pp. 70-82.

Pino et al., "Measuring Co2 with Arduino: Creating A Low-Cost Pocket-Sized Device With Flexible Applications That Yields Benefits For Students And Schools", Journal Chemical Education, 2019, vol. 96, pp. 377-381.

Sensirion SCD4x Breaking the size barrier in CO2 sensing Datasheet, www.sensirion.com, Version 1.1, Apr. 2021, 22 pages.

* cited by examiner

SENSING DEVICE AND REPORT GENERATION WEB SITE ACCESSED THROUGH DYNAMIC QR CODES

CROSS-REFERENCE TO RELATED APPLICATIONS

This application claims the benefit of priority under 35 U.S.C. § 119 of U.S. Provisional Patent Application No. 63/383,671, filed Nov. 14, 2022 and titled "SENSING DEVICE AND REPORT GENERATION WEB SITE ACCESSED THROUGH DYNAMIC QR CODES," which is herein incorporated by reference in its entirety. In addition, this application incorporates by reference in its entirety Patent application Ser. No. 17/745,737, filed May 16, 2022 and titled "CO2 SENSOR AND METHOD OF SENSING CO2."

BACKGROUND

Field

The field relates to sensing devices and sensor systems, and more specifically to sensing devices that generate a quick response (QR) code for managing measurement results of the sensing devices.

Description of the Related Art

Electronic sensing devices are devices for measuring and reporting sensed values. Environmental sensing devices may measure carbon dioxide ($CO_2$) levels, volatile organic compound (VOC) levels, humidity, and/or temperature. Electrical sensing devices may include test equipment for measuring voltage, current, magnetic fields, resistance, capacitance, inductance, and/or power. Mechanical sensing devices may measure force, pressure, distance, and/or angles. Health sensing devices may measure a patient's blood pressure, heart rate, weight, body mass index (BMI), electrocardiogram (EKG), and/or blood chemistry. All of the sensing devices may include measurements of geographic location, time, and/or diagnostic values for servicing the equipment.

SUMMARY OF THE DISCLOSURE

Sensing device and report generation web site accessed through dynamic QR codes are disclosed herein. In certain embodiments, a sensing device includes a first sensor, a memory, a controller configured to execute a code to capture sensor measurements from the first sensor and to store the sensor measurements in the memory, and a user interface including a display configured to display an array of pixels. The controller causes display of a quick response (QR) code on the display, the QR code encoded with a query string representing the sensor measurements.

In one aspect, a sensor system is provided. The sensor system includes a sensing device including a sensor, a controller, and a reader device. The controller receives sensor measurements from the sensor, stores the sensor measurements in a memory, and creates a QR code encoded with a query string representing the sensor measurements. The reader device includes a reader configured to read the QR code. The reader device displays a web page including the sensor measurements.

In another aspect, a computer-implemented method is provided. The method when executed by a controller of a sensing device includes capturing sensor measurements from a first sensor of the sensing device, storing the sensor measurements in a memory of the sensing device, and displaying a quick response (QR) code on a display of the sensing device. The QR code is encoded with a query string representing the sensor measurements.

BRIEF DESCRIPTION OF THE DRAWINGS

Specific implementations will now be described with reference to the following drawings, which are provided by way of example, and not limitation.

DETAILED DESCRIPTION OF EMBODIMENTS

Figure 1:
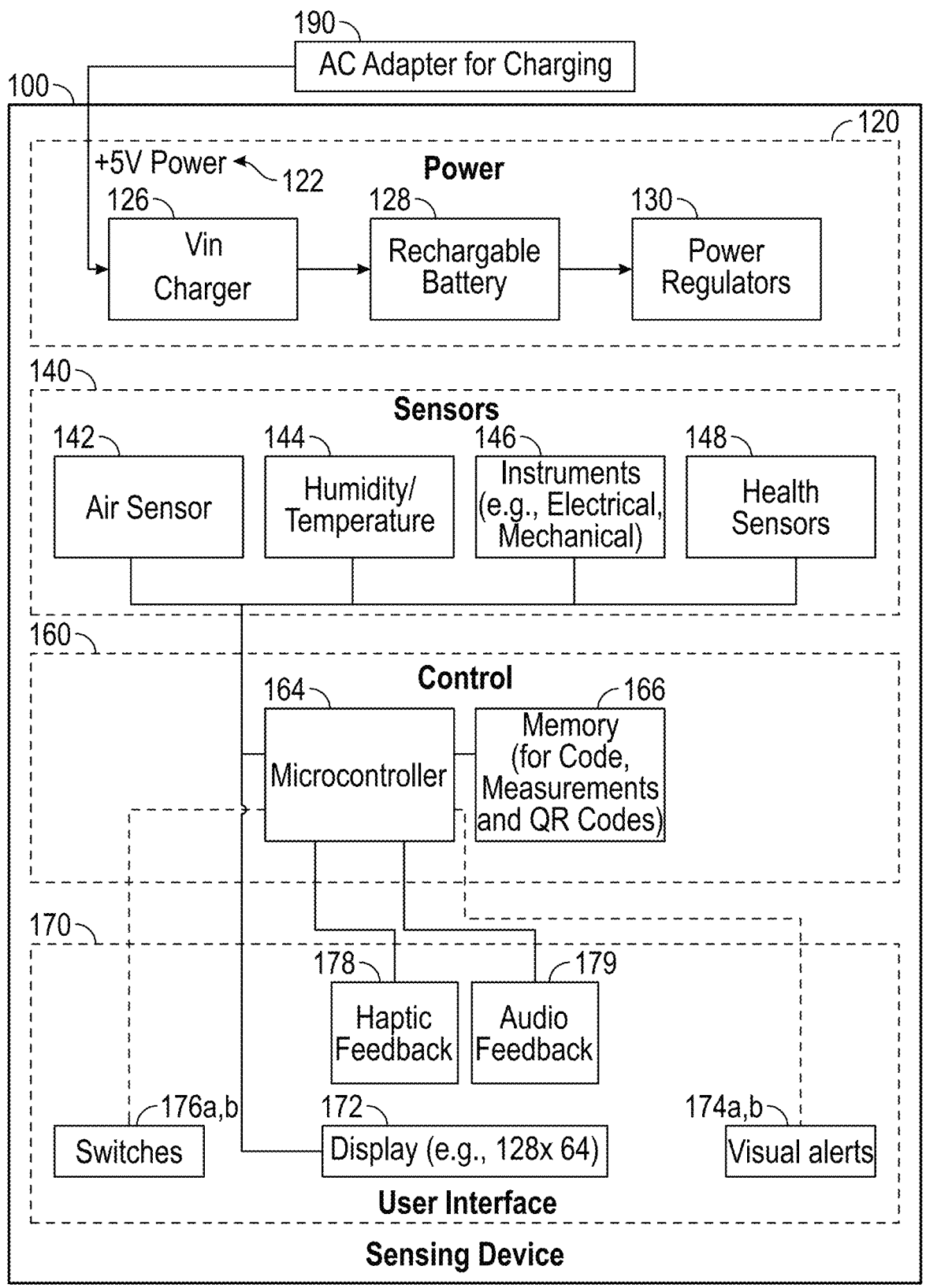
FIG. 1 is a block diagram of a sensing device.

The following detailed description of embodiments presents various descriptions of specific embodiments of the invention. However, the invention can be embodied in a multitude of different ways as defined and covered by the claims. In this description, reference is made to the drawings in which like reference numerals may indicate identical or functionally similar elements.

Many sensing devices allow for measurements in places where no external power is available and there is no dedicated link to communicate results. One such sensor is described in U.S. application Ser. No. 17/745,737, filed on May 16, 2022 (claiming priority to provisional application No. 63/189,239, filed on May 17, 2021), which is reproduced in Appendix A and hereby incorporated by reference in its entirety for all purposes. In certain embodiments, U.S. application Ser. No. 17/745,737 describes a battery-powered, wearable monitor that monitors CO 2 and VOC levels to measure the staleness of the air to help determine whether spaces are adequately ventilated.

Sensing devices may upload data for producing reports. Some sensing devices use wired or wireless connections to upload results.

When a sensing device has acquired sensed values, it is beneficial to provide a way to communicate the measurement values and to produce a report to document the measurements. Some devices use wired connections such as serial links or Ethernet connections, but wired links restrict the portability of the sensing device and add costs and complexity in uploading results. Wireless technology such as Bluetooth or Wi-Fi may be used to couple the sensing device to another device such as a cell phone or tablet, but these techniques have drawbacks both for the user and for the company providing the sensing device.

Coupling devices via a wireless link may require the user to perform a pairing operation or to have one of the devices enter the address of the device to be coupled. Such coupling carries well-known problems in security and/or connection reliability. The wireless traffic may be intercepted by others nearby and may require authentication and encryption to avoid interference or loss of sensitive data. The act of pairing is often unreliable and may involve repeated cycles to pair the device. Use of Wi-Fi in a portable device may pose connection and user-interface difficulties and require the user to find and connect to a local Wi-Fi hotspot. Some areas have no Wi-Fi coverage, or have only private networks, complicating the connection of the sensing device. Some devices depend on device-to-device Wi-Fi, but this can require one of the devices to be set up as a server and require the user to perform some action in order to join that network. Wireless connectivity may also require the user to find, download, install and login to an application on the cell phone or tablet.

Wireless pairing may also cause additional development time and effort from device manufacturers. It typically calls for the manufacturer to develop, deploy, and test mobile applications for a range of cell phones and tablets. These applications may require periodic updates to track changes to the hardware and operating system of the coupled devices.

Embodiments of the present disclosure simplify the uploading of data from sensing devices by leveraging the existing support for quick response (QR) codes on mobile phones and tablets. QR codes are two dimensional barcodes originally designed for use in identifying parts in automobile manufacturing. The codes are now in widespread use in advertising, product tracking, and access to online data such as restaurant menus. Mobile phones and tablets can read the QR codes using the built-in camera to connect to a web site without needing to type in the text string of the uniform resource locator (URL). Most current uses of QR codes are for showing data that does not change frequently, and the codes are often printed rather than being shown on a display.

The current standard for QR codes is specified in ISO/IEC 18004:2015 "Information technology—Automatic identification and data capture techniques—QR Code bar code symbology specification." The standard supports different sized codes with larger codes allowing encoding of greater amounts of data. A Level 1 code is a 21×21 array of white and black squares that can encode up to 17 bytes of data. The largest QR code that can fit on a display with at least 64 rows and columns is a Level 11 61×61 code that can encode up to 321 bytes or 468 alphanumeric characters. When a QR code encodes a string with the URL of a web site, the byte encoding is used with one character per byte. QR codes can encode more characters with alphanumeric characters (468 vs 321 in a Level 11 code), but the alphanumeric encoding restricts characters to uppercase-only and a string of these alphanumeric characters sometimes cannot hold all elements of a URL query string. In an example application of byte encoding, built-in camera apps in smartphones interpret the byte encoding of URL strings in QR codes to automatically open a browser to view the referenced web page. In an example of QR code generation, QR code generator tools and open-source software can accept a text string and generate the smallest QR code to communicate that string. While the byte encoding of query strings is described herein, the present disclosure is not restricted to any particular encoding scheme. For example, the present disclosure can encode data using alphanumeric characters, byte encoding, encoding schemes known in the industry, custom encoding schemes, and any combination of encoding schemes known or developed.

QR codes use Reed-Solomon error correction to provide the ability to recover information despite corruption of part of the code. For paper-based QR codes, higher error correction levels are useful because printed images may have smudges, wrinkles, and/or other blemishes. In the present disclosure, the QR code can be displayed on a display using one bit of the display for each element of the QR code. In this environment, the lowest level of error correction is usually adequate.

The present disclosure solves the wireless connectivity issues of portable sensing devices by communicating the sensed results with a dynamic QR code shown on the sensing device screen. Accordingly, the user of the sensing device only needs to use a reader (e.g., a cell phone's camera) to scan the QR code to open a web page showing the sensing results. As described herein, modern mobile phones and tablets can read the QR codes using the built-in camera, and there is no need to write or install an application on the phone to read the QR code. Many mobile devices with cameras currently include the ability to scan a QR code and open a browser at the URL encoded in the QR code. The web site is opened without the need for the user to enter information in order to see the page pointed to by the QR code. In various aspects of the present disclosure, the QR code includes not just the URL, but also includes a dynamically generated query string with recently sensed data.

During operation, sensed values are saved in a memory (e.g., a static random access memory (SRAM) as one example). When it is desired to produce a report, the user interacts with the device's user interface (for instance, by a tactile input, a voice input, and/or other suitable user input) to bring up a screen showing a QR code that encodes the sensed data values. Thus, the QR code can be produced in response to an instruction from a user. The screen can be produced by first converting the sensed data into a format suitable for communicating using the query string appended to the URL. When the user focuses the camera on the screen's QR code, the reader device (e.g., the cell phone) opens a web page and communicates the query string along with the URL of the web page. The web page reads the encoded query string and presents a web page based at least in part on the data extracted from the query string. An embodiment written in JavaScript, HTML, and CSS allows for user input, then links to a second web page that presents a report that includes graphs showing the sensed parameters over time. The sensing device includes a display capable of displaying a QR code of sufficient size to show the desired amount of sensed data.

FIG. 1 is a block diagram of a sensing device 100 according to an embodiment. The sensing device 100 can include sections for power 120, sensors 140, control 160, and user interface 170.

The power section 120 can include a +5V power 122, power regulators 130, a battery charger 126, and a rechargeable battery 128. The rechargeable battery 128 can be charged through an AC adapter 190, which can plug into an AC outlet such as a standard 120V outlet. In some embodiments, non-rechargeable batteries could be used in place of or in addition to the rechargeable battery 128, the battery charger 126, and the AC adapter 190. Thus, although one example of the power section 120 is depicted, the sensing devices herein can be used in accordance with other implementations of power sections.

The sensor section 140 can include sensing devices specific to the type of environmental monitor, test equipment, or health monitor which are coupled to microcontroller 164 of the control section by parallel connections or serial connections of an interface (also referred to as a bus), such as an inter-integrated circuit (I2C) or serial peripheral interface (SPI). In some embodiments, the sensor section 140 can include an air sensor 142 (e.g., a $CO_2$ sensor) along with humidity and temperature sensors 144. The sensor section 140 can include one or more instruments 146. In some embodiments, the instruments 146 can include test equipment with electrical and other sensors for some combination of voltage, current, magnetic fields, resistance, capacitance, inductance, and/or power. In some embodiments, the instruments 146 can include one or more mechanical sensors for measuring some combination of force, pressure, distance, and/or angle. In some embodiments, the sensor section 140 can include one or more health sensors 148 for measuring some combination of blood pressure, heart rate, weight, body mass index (BMI), electrocardiogram (EKG), blood chemistry, and/or other measurements related to health.

The control section 160 can include the microcontroller 164 coupled to a memory 166. In some embodiments, the memory 166 and the microcontroller 164 can be part of the same component. For instance, in one example, the component can be the ST Micro STM32L072KZT6 low-power Cortex L0 processor with 192-Kbyte flash, 20-Kbye RAM and 6-Kbyte EEPROM. The flash memory can be primarily configured and used for program storage but may also be used for recording measurements. The RAM can be configured and used for variable storage, for periodically recording sensor measurements, and for constructing strings to be converted to QR codes. The EEPROM can be configured and used for variables to be retained through power cycles, for instance including user preferences for the user interface and preferred measurements and measurement frequencies. A microcontroller can be more generally referred to herein as a controller, a processor, or a programmable controller.

The user interface section 170 can include a display 172, one or more switches 176a, 176b, and one or more visual alerts 174a, 174b, haptic feedback 178, and audio feedback 179. The display 172 can display an array of pixels. The pixels can have N×M pixels. For example, N of the N×M pixels can be 64 and M can be greater than or equal to 64. In some embodiments, the display 172 can be a 128×64 organic light-emitting diode (OLED) display. Each pixel of the display can show a pixel of a QR code and hence this display can show standard QR codes up to a Level 11 61×61 QR code that can encode up to 321 characters. The one or more switches 176a may be activated by the user to request the display of a QR code with recent measurements. Other switches 176b may be configured and used to vary the duration and interval between measurements to be communicated through the QR code.

In certain embodiments, the sensing device 100 has a length, width, and height each less than 24 inches, thus allowing the sensing device 100 to be portable by a user.

Figure 2A:
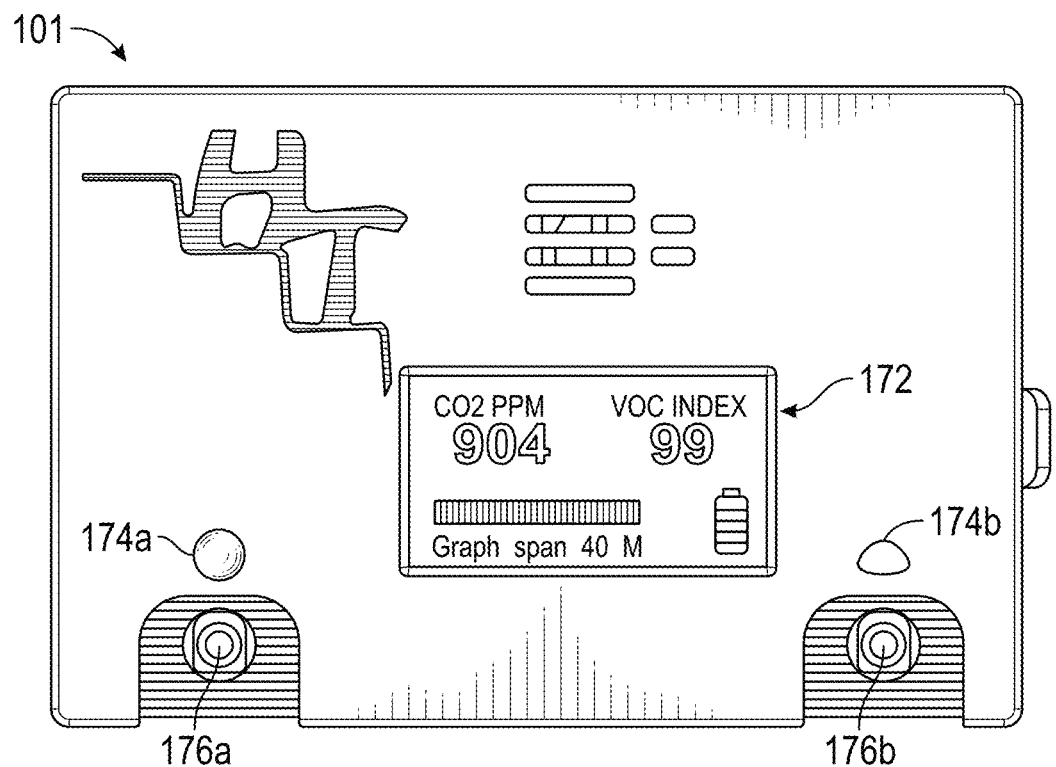
FIG. 2A is a front view of a sensing device displaying sensed values.
Figure 2B:
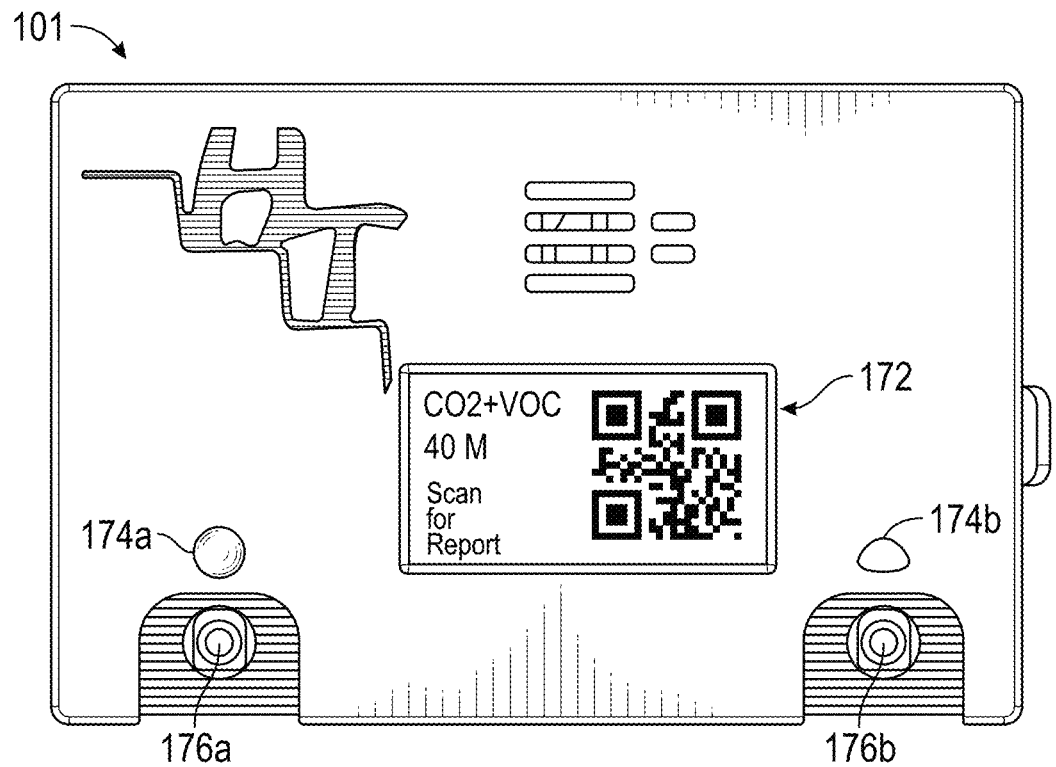
FIG. 2B is a front view of a sensing device displaying a QR code representing the sensed values.

FIG. 2A shows an embodiment of a portable air quality sensing device 101 showing CO 2 and volatile organic compound (VOC) index levels on a display 172. FIG. 2B shows the air quality sensing device 101 after a switch 176a has been activated to display a QR code (e.g., a Level 10 57×57 QR code encoding up to 213 bytes) representative of recent sensor measurements on the display 172. The air quality sensing device 101 can be an example of the sensing device 100. The air quality sensing device 101 can include the components of the sensing device 100 disclosed herein. The air quality sensing device 101 can include the display 172, the switches 176a, 176b, and the visual alerts 174a, 174b. As disclosed herein, the QR code can be read by a reader of a reader device, such as a camera included in a cell phone, to open a web page showing the results of the recent sensor measurements. Therefore, the results can be transferred to an external device (not shown) associated with the reader without a physical connection, a Bluetooth connection, or a Wi-Fi connection between the air quality sensing device 101 and the external device. In this example, 40 $CO_2$ measurements at 1 minute intervals are encoded in the QR code and displayed on the report web page. When the device is on longer, the user can select longer intervals to show the sensor value trend over longer periods of time.

Figure 3A:
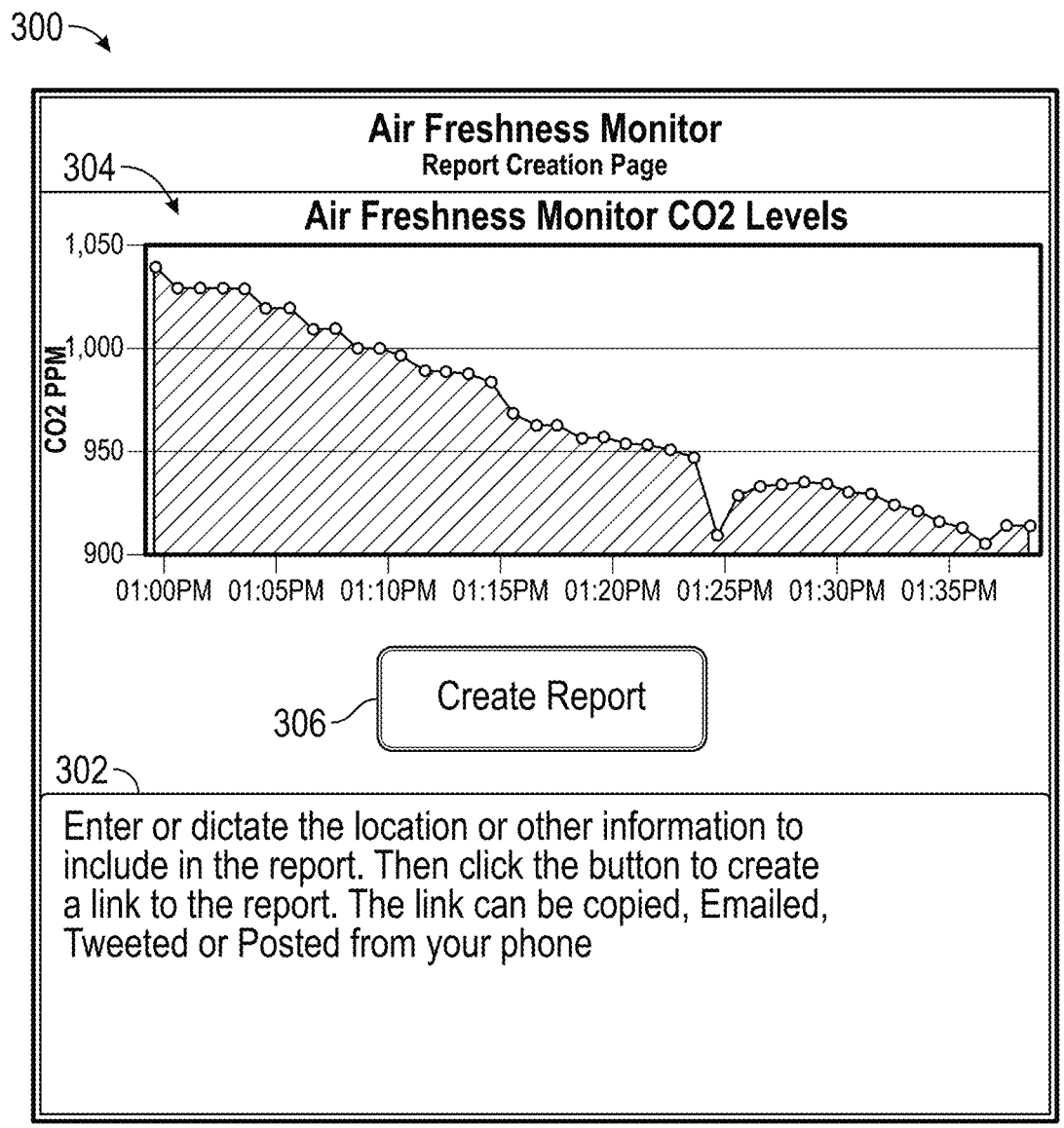
FIG. 3A is a web report_request web page displayed on a portable device after scanning the QR code.

FIG. 3A shows a report_request web page 300 as displayed by a browser on a device associated with a reader (e.g., a phone or table) after reading the QR code displayed on the sensing device 100, such as the air quality sensing device 101 of FIG. 2B. This page can include a text box 302 that allows the user to add information to be included in the report. The text field may be entered by any means available on the phone/tablet including keyboard entry, pasting content from other applications, or dictating information using speech-to-text translation. The example shown in FIG. 3A is for a device that monitors $CO_2$ levels (results of which are shown in a result section 304), and for this type of device, the text box is typically used to enter the location or other information about where the measurement took place. Other devices may use the text field to enter information about test protocols, test conditions, or identification of equipment or personnel conducting the tests. In health monitoring applications, the text box may be used to enter other health information.

Figure 3B:
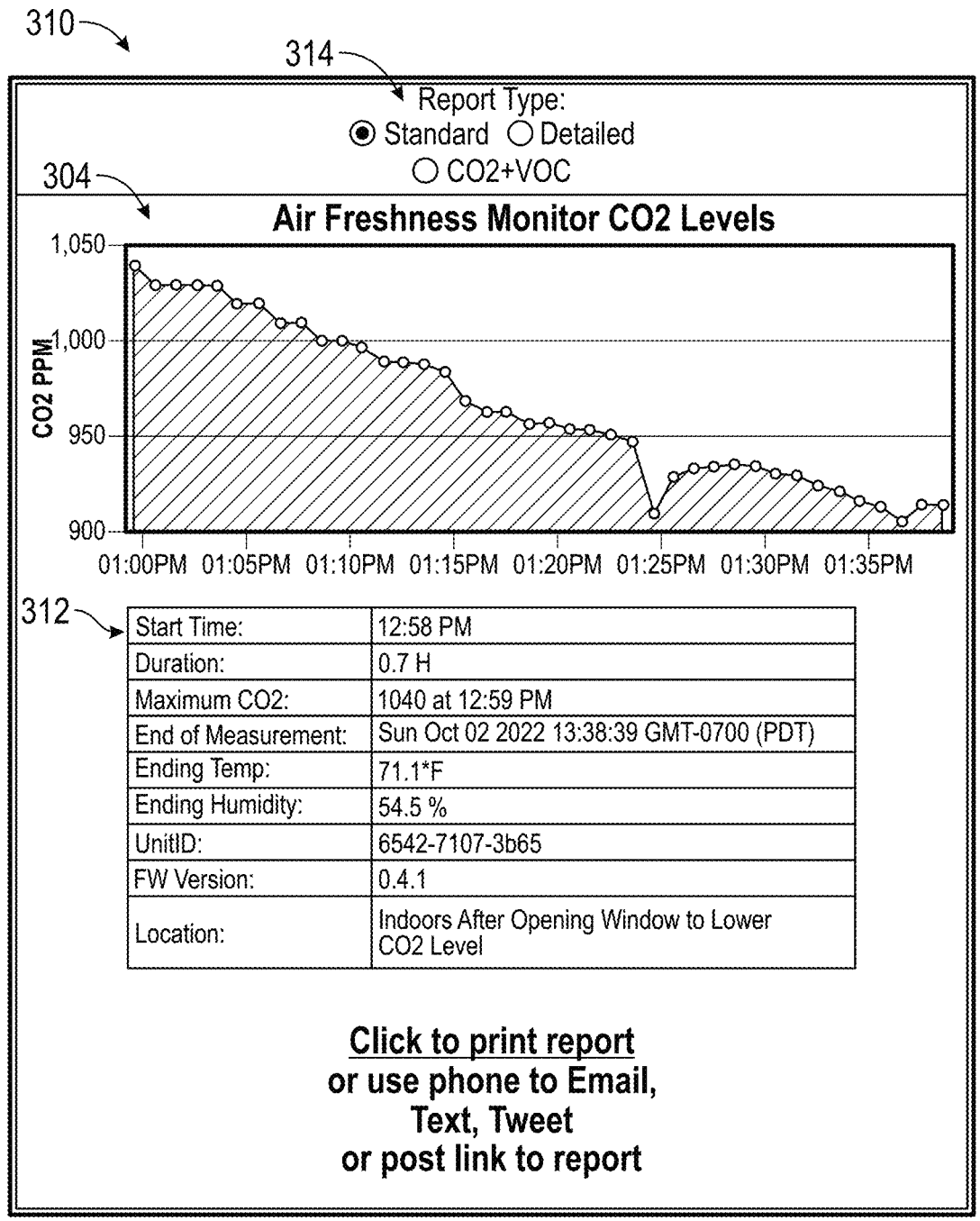
FIG. 3B is a report web page displayed after entering user information on the report_request web page.

FIG. 3B shows a report web page 310 displayed after the text field has been entered through the text box 302 of the report_request web page 300 and a button 306 has been clicked to indication completion. The report web page 310 and the report_request web page 300 have different URL+ path, and thus the report web page 310 can be interacted with and manipulated by a user without prompting the user to add information to be included in the report and/or without impacting the determined time that the report was generated. This page shows the sensed data displayed as a graph in the result section 304 and includes X-axis labels with the times of each measurement. In some embodiments, the times can be calculated by the JavaScipt code rendering the web page based at least in part on the time the report is generated along with a fixed interval between points.

The QR code can include information about the time interval between measurements and does not need to encode a separate time value for each measurement. In this way, the amount of information that needs to be encoded in the QR code is reduced. Typically the measurements are periodic and a single time delta is sent before the sequence of measurement data. The JavaScript code records the time when the report is generated which is close to the time of the last measurement. The code subtracts multiples of the known time interval to determine the time of earlier measurements. This arrangement simplifies the sensing device because it does not require a mechanism to set or maintain real-time information; it only needs to accurately set the time between measurements. This time measurement is a simple division of the processor clock frequency, and there is no need to initialize or keep any real-time counters running when the sensing device is powered off.

FIG. 3B also shows, in an information section 312, other information about the measurement including the serial number of the sensing device, firmware revision level, and one-time measurements of other sensors such as temperature and humidity. Any relevant information can be included in the report.

The report page in FIG. 3B also shows other buttons 314 to allow the user to link to other reports or to print the report. For example, shown data can be switched between a standard report view and a detailed report view by selecting the buttons 314. Detailed reports may add other information including tables of results for uploading to other graphing or analysis applications. Detailed reports can also include diagnostic information for use in troubleshooting failures of the sensing device.

Figure 4A:
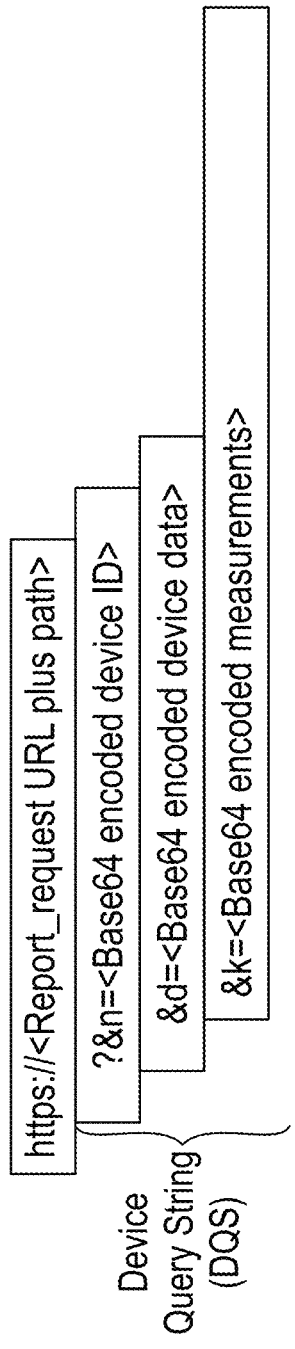
FIG. 4A is a diagram showing the structure of the report_request_link.

FIG. 4A is a diagram showing a format of a report_request link encoded in the QR code to link to the report_request web page. The format can include the URL of the web site hosting the report generation page followed by a path name. The remaining information, known as the query string, includes fields that hold the sensor data plus other data, such as the serial number of the device. In some embodiments, the query string can be encoded with a modified base64 encoding that uses one of 64 unique characters (a-z, A-Z, 0-9, '_' and '-') to encode 6 bits of data. Multiple characters may be used when higher precision is required. In some embodiments, each measurement can be encoded as two characters with 12-bit resolution. Two bits are used for a power of 10 exponent while the other 10 bits are a mantissa with three decimal digits of resolution. This representation gives 3 significant digits of resolution: 0-999 by 1's, 10-9,990 by 10s, 100-99,900 by 100s and 1000-999,000 by 1000s. The microcontroller encodes the measurement data into the query strings and the web site JavaScript code decodes the strings.

Figure 4B:
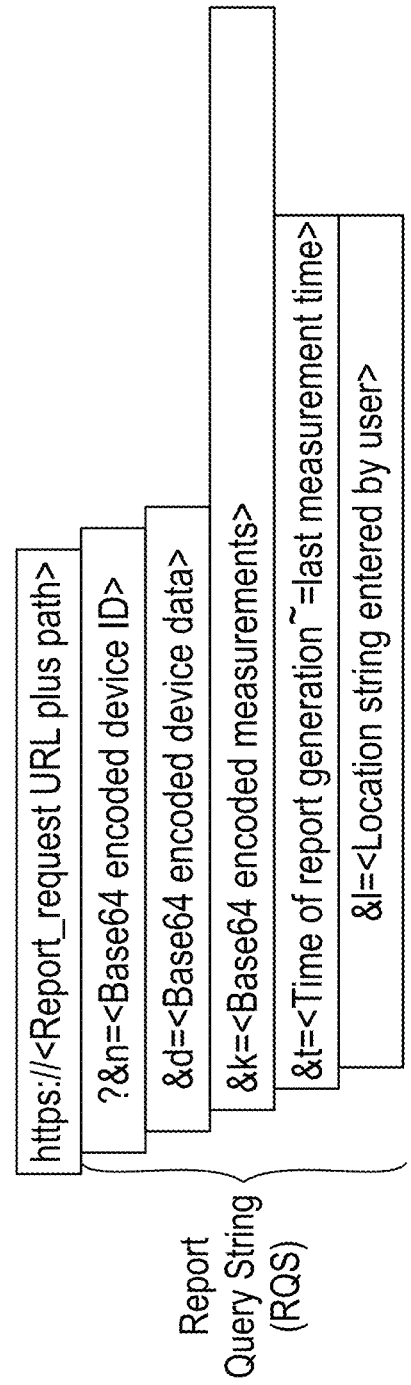
FIG. 4B is a diagram showing the structure of the report_link.

FIG. 4B. is a diagram showing a format of a report_link generated by the JavaScript code that renders the report_request web page. The report_link includes the measurement data portion of the report_request_link but adds time information and user-entered text such as text identifying a location where the measurement took place.

Note that the report_request and report web pages need no login information. The web page code can be context-free and the same code can be used to display reports from different devices with no need for a database to record information. The entire context can be carried by the query strings. Future enhancements can be made to the web pages without the need to make any changes to either the hardware or software running in the sensing devices. Version control, such as the firmware revision level, can be used to make a web site downward compatible when newer sensing devices add or modify the information communicated through the dynamic QR codes. Users need not give up any private information in order to produce or view reports. The user can keep the report information private or share it as desired. It is shared only when the user decides to send the link to someone else.

Figure 5:
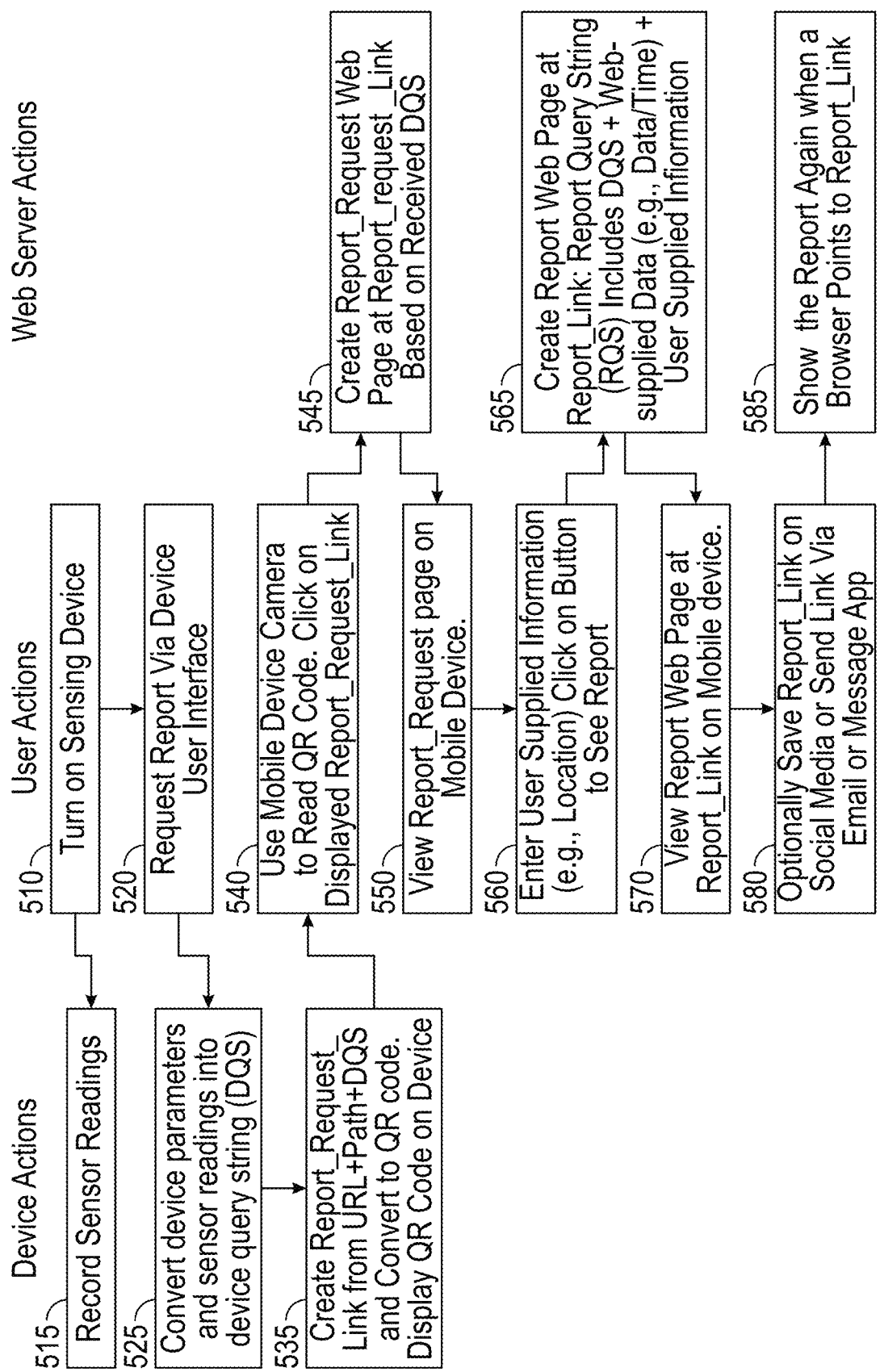
FIG. 5 is a flowchart of software operation of the sensing device including interactions with the user and web sites.

FIG. 5 is a flowchart showing an operation of a sensor system that includes a sensing device (e.g., the sensing device 100 of FIG. 1). The middle column shows operations initiated by the user. Though FIG. 5 shows the operations initiated by the user, in some embodiments, one or more operations may be automated and no user interaction may be needed. The left column shows actions performed by the device and the right column shows actions performed by the web site server. Certain steps in FIG. 5 can be combined or omitted, and the sequence of the steps can be altered as suitable.

In step 510, the sensing device can be turned on. For example, the user can power on the sensing device. After powering up, the device transitions to step 515 in which the sensing device captures sensor data. The type and frequency of data captured may be specified or altered via the user interface. This interaction is not shown in the flowchart. In step 520, the sensing device can receive a request in response to a user request action. For example, the user can request to create a report of previously captured sensor data and initiate a report creation process via the user interface. In an embodiment, one of the switches acts as a report initiation mechanism when certain measurement screens are displayed.

In step 525, the sensing device converts device parameters and sensor readings into a device query string (DQS). In step 535, the sensing device responds to the report initiation by generating a report_request string comprising the URL+path of the web page that will generate the report, along with previously captured sensor data. Generation of the report_request string includes encoding the data into the DQS using a format such as base64 with 6 bits per character. In some embodiments, each sensed data point is encoded with two characters to represent 12 bits of data. Other representations or data precision could be used for some or all of the data to be sent. Some data fields are nearly static (such as the firmware level and ID of the device), while other values may change frequently as the sensed values change. The URL, the path, and the DQS are concatenated to form the report_request string which can be converted to a QR code to be displayed. The translation of a fixed length string to an N×N QR code uses a well-known algorithm. The code selects the minimal size QR code based at least in part on the string length and a desired amount of redundancy in the code for error correction. In some embodiments, minimal error correction can be used to allow for the largest strings to be encoded in the pixels of a small display. For example, a display with a maximum of 64 rows or columns can display standard QR codes up to level 11, which is a 61×61 QR code encoding up to 321 characters. In order to display two graphs with a maximum of 40 points each with two characters per point, the DQS requires 160 characters for the graph data. The remainder of the report_request string encodes URL+path plus other information including the ID of the sensing device, firmware revision, values of other sensors, and diagnostic/service information to help in troubleshooting failing devices.

In step 540, when the sensing device is displaying the QR code, the user points a reader (e.g., a cell phone or tablet camera) at the QR code. The phone/tablet allows the user to click on the link to display the report_request web site in step 540. Step 545 shows the actions of the web server to render the report. In step 550, the user can view the report_request web site. The URL+path causes the web server to receive the DQS which it then parses and decodes to retrieve the sensor and other data. In some embodiments, the parsing and decoding is done by JavaScript code. The sensor data can be presented as a web page based at least in part on JavaScript, HTML, and CSS code. FIG. 3A shows a web page generated by this code. Other web development languages could substitute for JavaScript, HTML and CSS.

In step 560, the user can view a prompt to enter any desired additional information into a text box. In some embodiments, the sensing device can be a $CO_2$ monitor device, and the user can enter information about the location where the measurements had taken place. In other applications, the added information could include location, identification of the person who performed the measurements, or other equipment or procedures. In health monitor applications, additional information could include other health information such as diet or recent exercise. By providing a text box, the device allows for the user to provide any relevant information for a particular type of sensing device.

Once the user input is complete, the user can click a button on the report_request web page in step 560 to cause the web server to generate the report in step 565. The report_request web site creates the RQS (report query string)

by concatenating the DQS, the user-supplied text string and a string representing the current date and time. The report_link can be generated by concatenating the URL+path of the report site and the RQS.

The report_link can be generated as the user points the reader (e.g., the phone/tablet camera) at the sensing device. The link is typically generated only a few seconds after the last sensor values were recorded and the time when the report-link is generated can be used as a close approximation to the time of the last sensor value to be graphed. The times of earlier sensor values can be determined or estimated based at least in part on the interval between sensor readings.

In step 570, the user can view the new report web page on a user device (e.g., the phone/tablet) associated with the reader. The report web page may show graphs and/or tables of sensor values plus lists of other information passed through the query string generated by the QR code. FIG. 3B shows a report web page produced by an embodiment of the present disclosure.

In step 580, while viewing this web page, the user can share the report_link using the standard features of the phone/tablet which typically has options for posting to social media (e.g., Twitter/X, Facebook, or Instagram), saving to an installed app (e.g., Notes or Evernote) or sending the link via Email or a messaging app. Note that this type of sharing shares the report_link which is a short text string, not a large image of a report. The actual image seen by the recipient can be generated by the web server hosting the report site when it receives the report link.

In step 585, the report can be generated again after the link is shared or a saved link is retrieved. Note that even though the new copy of the report may be generated long after the sensor measurements, the original times are preserved because the times are part of the RQS in the report_link.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various drawings shown in the figures depict example arrangements of elements and components, additional intervening elements, devices, features, or components may be present in an actual embodiment.

Although various aspects are described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. A sensing device comprising:
   a first sensor;
   a memory;
   a controller configured to execute a code to capture sensor measurements from the first sensor and to store the sensor measurements in the memory, the sensor measurements including a series of sensor measurements over time; and
   a user interface including a display configured to display an array of pixels,
   wherein the controller is configured to cause display of a quick response (QR) code on the display, the QR code encoded with a query string representing the series of sensor measurements over time, wherein a 12-bit sensor measurement is encoded into a pair of base 64 characters.

2. The sensing device of claim 1, wherein the QR code, when read by a reader device including a reader and a first web site running code that decodes the query string, prompts the reader device to present a first web page.

3. The sensing device of claim 2, wherein the reader device further presents a second web site in response to receiving the query string generated from the first web site and presenting a report showing the sensor measurements.

4. The sensing device of claim 1, wherein the array of pixels comprises N×M pixels, and the QR code comprises less than or equal to N×N pixels.

5. The sensing device of claim 4 wherein N is 64 and M is greater than or equal to 64.

6. The sensing device of claim 1, wherein the sensing device is battery powered.

7. The sensing device of claim 1, wherein a firmware revision is included in the QR code as encoded data.

8. The sensing device of claim 1, wherein the sensor is configured to sense $CO_2$ levels.

9. The sensing device of claim 1, wherein the sensing device is electronic or mechanical test equipment for measuring some combination of voltage, current, magnetic fields, resistance, capacitance, inductance, power, force, pressure, distance, and angle.

10. The sensing device of claim 1, wherein the sensor is configured to sense health values for measuring some combination of blood pressure, heart rate, weight, body mass index (BMI), electrocardiogram (EKG), and blood chemistry.

11. The sensing device of claim 1, wherein the sensor measurements include information about operation of the sensing device to aid in diagnosing failures of the sensing device.

12. The sensing device of claim 1, wherein an interval between successive time-related sensor measurements is communicated by the QR code.

13. The sensing device of claim 12, wherein the QR code, when read by a reader device, causes the reader device to display a web page showing a graph of sensor values on one axis and time on another axis.

14. The sensing device of claim 13, wherein the QR code does not encode a separate time value for each measurement of a sequence of measurement data and a time value for each measurement value is computed based on the interval and a time when a report is generated.

15. The sensing device of claim 1, wherein a 12-bit value is partitioned into a 2-bit exponent and 10-bit mantissa to represent a sensor measurement with 3 significant digits of resolution.

* * * * *